United States Patent

[11] 3,563,425

| [72] | Inventor | Thomas C. Clark<br>Playa del Rey, Calif. |
| --- | --- | --- |
| [21] | Appl. No. | 789,208 |
| [22] | Filed | Jan. 6, 1969 |
| [45] | Patented | Feb. 16, 1971 |
| [73] | Assignee | Phil Mustain |

[54] LIQUID DISPENSER HAVING CAPILLARY OUTLET
11 Claims, 4 Drawing Figs.

| [52] | U.S. Cl. | 222/478 |
| --- | --- | --- |
| [51] | Int. Cl. | B67d 3/00 |
| [50] | Field of Search | |
| | 401/(Inquired), 261; 222/420 (Inquired), 54, 478 | |

[56] References Cited
UNITED STATES PATENTS
2,656,070  10/1953  Linder........................  222/420X

*Primary Examiner*—Stanley H. Tollberg
*Attorney*—Smyth, Roston & Pavitt

ABSTRACT: A liquid-dispensing apparatus is disclosed in which an L-shaped capillary tube extends down from a container holding the liquid. The container has capillary relief openings and the tube has a narrow slot in the bent portion of the L, through which liquid is dispensed upon contact with a wettable surface.

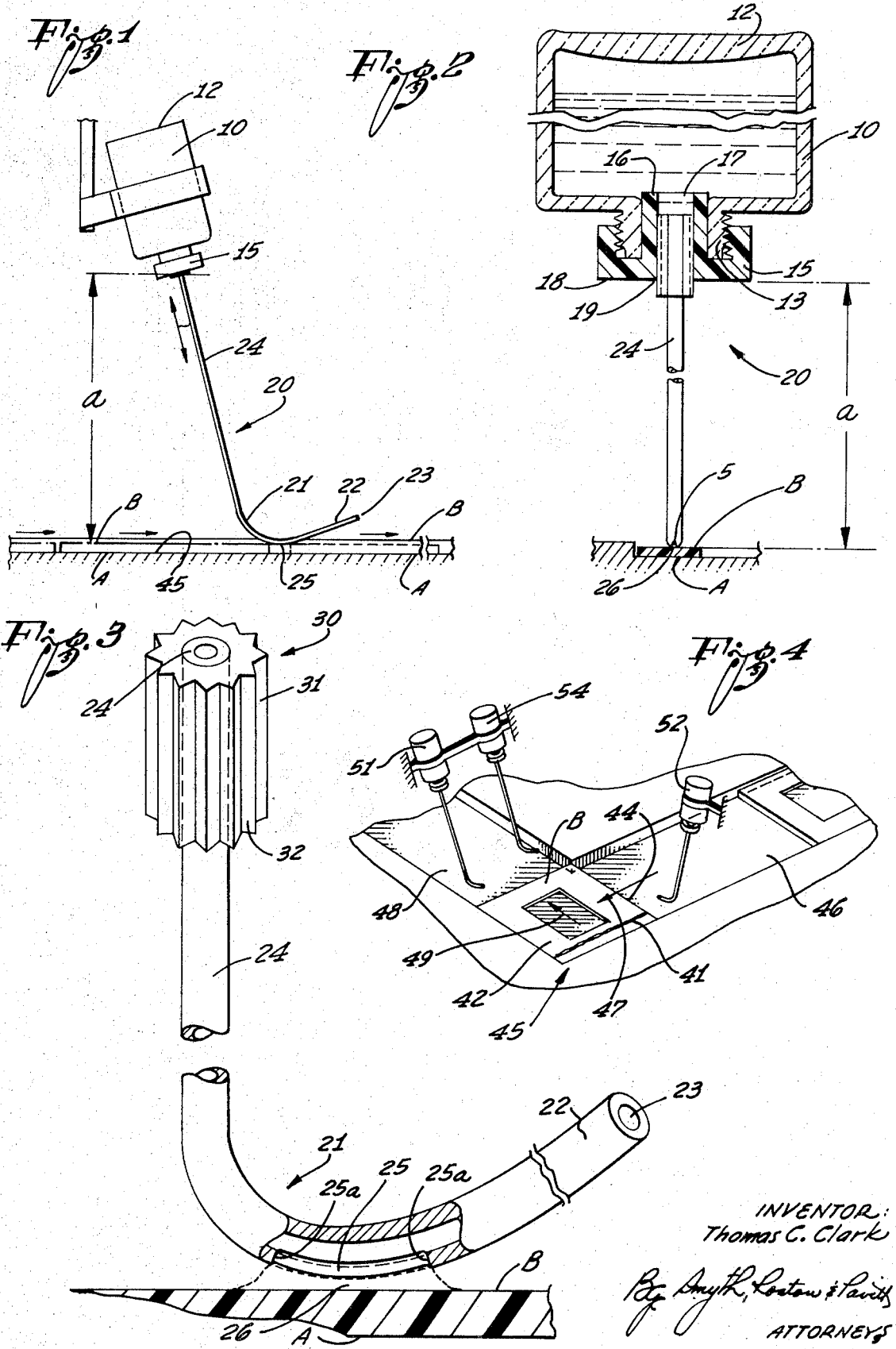

LIQUID DISPENSER HAVING CAPILLARY OUTLET

The present invention relates to a liquid-dispensing apparatus. More particularly, this invention relates to a liquid-dispensing apparatus in which liquid is dispensed upon contact or near contact of the apparatus with a surface upon which liquid is to be dispensed.

An apparatus to be constructed in accordance with the invention permits dispensing of a liquid, so that liquid flow from the dispenser can be adjusted to begin when the surface of an object is in close proximity to an orifice and flow is to cease when the surface of the object recedes from the apparatus. In other words, it is the particular object of the invention to provide a liquid-dispensing apparatus in which the dispensing liquid is not controlled through valves, taps, or the like, but solely in dependence upon relative positioning of the object upon which liquid is to be dispensed. It is another object of the invention to provide a liquid-dispensing apparatus in which flow and rate of flow can be adjusted to be sustained and maintained independently from the liquid level in a reservoir.

In accordance with the invention, in a preferred embodiment thereof, it is suggested to provide a container for the liquid as reservoir and to attach capillary tubing to the container to extend down from the container, thereby establishing a generally downwardly extending, principally vertically oriented liquid column in such a tube as the tube communicates with the interior of the container. The tube has a bent off portion in its lower region, so that the tube end faces laterally away, preferably in a slightly upward direction from a lowest point of the tubing at the bent portion thereof. That lowest area is provided with a narrow longitudinal slot.

The object upon which liquid is to be dispensed is brought in contact or near contact with that slot. Near contact is intended to mean contact with the liquid meniscus in the slot of the tube. The meniscus may tend to have an outwardly bulging convex configuration tending to form a drop, but the liquid height should be adjusted to be insufficient to provide enough pressure that, in fact, a drop can be formed in the absence of a near contact object surface. If a wettable surface of an object is positioned close enough to engage this outwardly extending liquid meniscus, boundary conditions for the meniscus are disturbed, and liquid flows onto the wettable surface.

Near the bottom portion of the container capillary channels are provided as relief openings to communicate with the interior of the container near the lowest operating liquid level therein. These capillary channels, if narrow enough, prevent liquid outflow from the container other than through the tube. However, as liquid is dispensed through the tube and the slot, these capillary channels will permit air to enter, to bubble through the liquid in the container, to the space above the liquid level therein. Adjustment of the region where these capillaries communicate with the outer atmosphere in relation to the height of the region above the slot in the tube, permits adjustment and metering operating flow of the liquid through the slot. If that height is, for example, intentionally adjusted too far below a minimum value, the liquid-dispensing apparatus is, in fact, deactivated, so that even upon contact with an object, no, or practically no, liquid will be dispensed.

It can be seen from the foregoing that the liquid-dispensing apparatus operates in response to positioning and removing of objects from the immediate vicinity of the slot. More generally, liquid is dispensed through a lower one of two communicating capillary openings provided at different levels, with a reservoir extending above the higher one of these openings, and being closed thereabove; liquid dispensing being conditioned upon boundary modifications in the vicinity of the lower one of the openings by means of a wettable surface. The liquid dispensing is therefore automated, per se. Automation may include further the automatic placement of such objects into the liquid-dispensing position, their passage at the slot in particular distance of near contact and the removal of the objects from the dispenser. This is of particular advantage if the liquid operates as a bonding agent to be dispensed on surfaces subject to a subsequent bonding operation.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a side view of a liquid-dispensing apparatus in accordance with the preferred embodiment of the present invention;

FIG. 2 illustrates a sectional view through portions of the apparatus shown in FIG. 1;

FIG. 3 illustrates a perspective view, partially as a section view, of the liquid-dispensing tube used in the apparatus shown in FIG. 1 as inserted in a member which, together with the container included in the liquid-dispensing apparatus in FIG. 1, defines the capillary relief openings; and FIG. 4 illustrates somewhat schematically a system for particularly dispensing liquid on particular surfaces of particular objects when passing.

Proceeding now to the detailed description of the drawings, in FIG. 1 there is illustrated an overall view of a liquid dispenser in accordance with the preferred embodiment of the present invention. The liquid dispenser is comprised of a container 10, such as a bottle, which is positioned by means of a suitable holder 11 so that what normally constitutes it s bottom 12 faces up and the bottleneck faces down, accordingly. A screwcap 15 to be described in greater detail with reference to FIG. 2 is screwed onto the bottleneck, and a tube 20 projects from screwcap 15 in a downward direction.

It was found to be of particular advantage that the tube has an angle to the vertical. Actually, the bottle 10 is positioned at an angle but such a slanted position of the bottle is only incidental, as it is convenient to have tube 20 project straight up from cap 15. The desirability of a slant relates only to the tube.

The tube 20 is generally L-shaped with a long stem portion 24, a bent or curved portion 21 and a short leg 22. In the operating position of the liquid dispenser illustrated, leg 22 is slightly upwardly inclined in regard to the horizontal. The tube portion 22 is open at 23.

An object A, having a surface B which extends transverse to the plane of the drawing and onto which liquid is to be dispensed, is slid under the bent portion 21. Object A thereby slides on a track or bed 45. When in position illustrated in dash-dotted lines, the leading edge of object A is about to make contact or has closest, near contact position with the most downwardly facing portion 26 of the bent 21. As will be more fully explained with reference to FIGS. 2 and 3, liquid will be dispensed onto surface B through a slot 25 in bent portion 21.

As the object A is moved in bed 45, progressive portions of surface B pass in close vicinity to the lowermost portion 26 of the tube bent 21 and at the region 25 thereof; liquid is dispensed in that liquid adheres to the wettable surface B. Liquid continues to flow as long as surface B of object A remains in physical contact with or in close vicinity to the bent portion 21 at slot area 25. Dispensing ceases as soon as the trailing edge of object A recedes from the slot 25 which is a position of object A illustrated in dotted lines in FIG. 1.

Turning now to particulars of the construction of the dispenser and referring particularly to FIGS. 2 and 3, t there is shown in FIG. 2, a bottleneck 13 of bottle 10, extending in downward direction and having a threaded portion on which is screwed the cap 15. Cap 15 has a cylindrically formed center tube 16 with a central cylindrical bore 17. A stopper 30, shown in perspective view in FIG. 3, is slidingly received by the bore 17. It should be mentioned that the sole purpose of cap 15 is to provide a relatively large opening of the bottle for refilling and to define particularly the bore 17 for stopper 30. From a general point of view, 17 constitutes a not upwardly directed opening of the container.

Element 30 resembles a stopper only as to its overall configuration. Stopper element 30 is axially penetrated by a cylindrical bore which receives the upper end of stem 24 of tube 20. The "cylindrical" periphery of this body 30 has axially extending ridges 31 respectively defining axially extending grooves 32 so that element 30 has star-shaped cross sections. As stopper 30 is inserted in bore 17, ridges 31 engage the wall of bore 17 and individual, narrow channels, i.e., capillary ducts are defined between the wall defining the bore 17 and each of the grooves 32 of elements 30.

The liquid in container 10 is presumed to have a certain surface tension, particularly a positive surface tension. Wettability of stopper and cap should be such that the liquid will not flow out through the grooves 32 when the bottle 12 is in the upside-down position illustrated, even if air at atmospheric pressure is above the liquid level of bottle 10. In other words, the channels as defined between grooves 32 and the wall of bore 17 have dimensions to form capillary paths so that the surface tension is capable of sustaining the liquid column as it extends from the downward-facing upper surface plane 18 of the cap 15 in the vertical capillary ducts 31, up to the liquid level in container 10.

Reference numeral 19 denotes particularly the lower end region of bore 17 in plane 18. 19, in effect, constitutes the lower opening for the capillary ducts 32—17, even though the grooves 32 still extend farther down. Meniscuses are formed in region 19, particularly in the relief ducts or channels 32 adjacent the lower end of the wall of opening 17. 19 can thus be regarded as the entrance for the capillary relief ducts for the container 10. Atmospheric pressure prevails above the liquid level in the container, as well as in plane 18. If the container 10 is not too large the surface tension of the liquid, as effective in region 19, was found to suffice so as to sustain the liquid column above a horizontal plane through region 19.

The bent portion 21 of the tube 20 has, as stated above, a slot 25, which is essentially a longitudinal slot, i.e., it is longer than it is wide. Tube 20 is essentially a capillary tube. A viscous liquid having a particular surface tension and when filled into the bottle 10 will descend into tube 20 and fill same throughout. Surface tension will counteract the pressure in the liquid column at the lowest point of the slot 25, which column extends up to region 19. If the inner diameter of the capillary tube and the width of slot 25 are sufficiently small, and if the tube bent 21 does not project too far down from plane 18, liquid will not flow out of slot 25 or tube end 23.

Slot 25 can be selected so that for a given inner diameter tube 20 can be pulled down to such an extent that a somewhat outwardly bulging liquid surface will form at the lowest point 26 of slot 25, but without forming a drop which can separate. If surface B of an object, such as A touches that projecting liquid surface, even without touching the tube, boundary conditions for the liquid are changed, and if that surface B is wettable by the liquid, the surface tension will provide a meniscus as between tube 20 at opening 25 and surface B. As object A is moved, cohesion of the particular liquid coacting with the tendency to wet surface B will cause liquid to flow out of the slot 25 and onto progressive portions of surface B of object A. That flow is sustained by the pressure in the liquid column in tube 20 as between a horizontal plane running through low point 26 and a horizontal plane through region 19. As soon as object A recedes from slot 25, at point 26, flow stops provided tube 20 did not extend too far down.

It is essential for proper operation and for understanding the advantage of such a relatively simple device, that the operation, i.e., the degree of regularity of liquid flow out of opening 25 and promptness of beginning as well as stopping of the flow is completely independent from the liquid level in bottle 10. This means that large quantities of liquid can be dispensed without level regulation or refilling, beginning with a full bottle to a practically empty bottles and without incurring irregularity as to the rate of flow sustained as long as an object such as A or sequential objects are in contact (or in near contact as defined) with the tube at opening 25 thereof. This is due to the fact that the principally determining factor for the initiation, sustenance and cessation of flow is the height $a$ of the liquid column between horizontal two planes, as defined above by opening 19 and point 26.

As stated, the stopper 30 with tube 20 is inserted is slidably received in the bore 17 in cap 15. This is particularly so because it is desirable to ascertain the best operating distance $a$ with regard to prompt flow beginning, regularity of flow, and prompt cessation of flow, solely in response to the position of the surface on which liquid is to be dispensed in relation to slot 25. In order to ascertain such operating optimum it is desirable to have a range available for adjustment of the height of the liquid column. Definition of that range requires more detailed consideration.

If, for a given dimension of the tube 20, and at a particular inserted position of stopper 30, in cap 15, tube 20, as so attached, is pushed too deeply into the cap (by pushing stopper 30 more deeply into the cap) the distance $a$ between opening 19 and point 26 is shortened, and a position can be found where, in effect, no flow can be sustained, or at least there is no regular flow. In this case liquid pressure is too low to cause liquid to bulge out of slot 15 to the extend that liquid can contact surface B, even though surface B does not contact tube 20 directly at point 26. Moreover, at too low a pressure in the liquid column above slot 25, even a directly contacting object, such as A, cannot break the surface tension at slot 25, so that surface conditions at the opening are not modified to such an extent that a flow can be initiated and sustained.

On the other hand, if stopper 30 with tube 20 is pulled out too far, it will become impossible to stop flow out of opening 25 once it too i.e., the pressure in the liquid column becomes too high to stop formation of drops in opening 25. In between two such positions of stopper 30 in the cap 15, one, wherein flow is practically completely inhibited regardless of the presence of an object near opening 25 and another position resulting in an uncontrollable dropping and outflow, there is a range which permits adjustment to the desired degree, prompt beginning and prompt cessation of flow. That range is not very large, and it is precisely for this reason that bottle 10 and tube 20 are somewhat inclined. A given adjustment distance as far as pushing stopper 30 into the cap or pulling it out is concerned, changes the height of the liquid level by a value equal to the adjustment distance times the cosine of the tilting angle. The resulting modification as to the liquid height is thus smaller than the adjustment distance of the tube which permits, accordingly, a finer degree and a more sensitive adjusting operation as far as adjusting the rate of flow is concerned.

Furthermore, end portion 22 of the tube performs a desired function as far as positioning of the opening 23 is concerned. It was found that when the portion 22 was made too short or when the opening 23 was closed, or when opening 23 62 was almost on the same level as point 26, outflow through opening 25 onto a near-contact surface B was quite irregular in general. For a minute change in the liquid column height $a$ there was a direct changeover from a very irregular flow (equivalent to practical flow stoppage) to an uncontrolled dropping and outflow without any range for adjustment to obtain a regular outflow rate.

It is believed that the average rate of flow through slot 25 onto an object A in its vicinity is determined only by the liquid pressure in the above-defined column, but the pressure in the liquid is subject to phenomena involving opening 19, as well as opening 23. As liquid flows out of opening 25, air bubbles through one or several of the channels 32 without, however, causing an outflow at relief opening entrance 19. Upon initiation of liquid flow air begins promptly to bubble through the channels 32, to substitute air for the liquid which left the system through opening 25. However, the system is not in complete equilibrium at any instant, as by no means each quantity of liquid leaving the system through opening 25 is immediately balanced by an exactly compensating amount of air above the liquid level in bottle 10. This replenishing process is, per se, an irregular one. In particular, it has to be observed that at the instant of first contact between liquid and surface B, the first liquid outflow is produced by operation of such contact as the liquid spreads rapidly onto the wettable surface. The surface B materially alters the surface configuration for the liquid at and near the opening 25, so that initial outflow is nothing but a rapid adaptation of the liquid surface to the change in liquid boundary configuration at and near opening 25. The replenishment of volume with air in the container follows that adaptation with some delay. Therefore, there is an irregular, possibly to some extent oscillatory, pressure variation in the liquid column above opening 25 tending to stop the flow after the initial "outflow."

The liquid in the portion 22 is believed to serve as a readily available liquid reservoir counteracting possible irregular flow within and through the main stem 24 of tube 20 as may result from these pressure variations, particularly from pressure drop after the initial spreading. The tube 22 open at 23 maintains operating pressure dynamically at opening 25 to thereby sustain regular outflow if surface B progresses to offer progressive areas to the opening 25 for "depositing" liquid on the wettable but not yet wetted surface. Such flow-equalizing operation will function properly only if, in fact, upwardly bent portion 22 communicates with the exterior so that the liquid level at opening 23 can readily follow any internal pressure variations tending to occur particularly in the lowest part of the liquid system.

THis pressure-sensitive auxiliary reservoir as provided by open end tube portion 22 is believed to be instrumental in equalizing the flow and in facilitating the adjustment as well as enlarging the adjusting range for controlling the rate of outflow. It is pointed out, however, that position and location of opening 23 does not modify the principal function of the dispensing operation and only is a means for sensitizing adjustment toward a very accurately determinable particular rate of outflow.

A liquid dispensing device of the type illustrated was used successfully to dispense a polystyrene solvent having acetone methylethylketone and toluolane as principal constituents. Such solvents are used to provide bonding operation between polystyrene parts. In particular, such dispensers were used to dispense such a solvent agent onto surface portions of a polystyrene slide binder element constructed as disclosed in my copending application, Ser. No. 697,335, filed Jan. 11, 1968 now U.S. Let. Pat. No. 3,477,160. In this application a two-element slide binder is disclosed ant the two separately manufactured elements are to be joined along three sides. Upon sliding one of the elements as object A underneath a bonding agent dispenser constructed as aforedescribed, predetermined quantities of the bonding agent are dispensed to permit subsequent bonding of the other slide binder element thereto.

FIG. 4 of the present application shows such a slide binder element 40. Surface portions to receive such bonding agents are denoted with reference numeral 31, 32 and 34 in the copending application, and they are presently denoted 41, 42 and 44 respectively. There are three liquid dispensers 51, 52 and 54 disposed in relation to and above an angled track 45, constituting bed 4, and in which slide binder elements are slid past the dispensers. The bed has a first track portion 46 wherein element 40 is slid along arrow 47 and then at right angles thereto in a second track portion 48 along arrow 49.

The liquid dispenser 51 is positioned so that upon passage of a slide binder element 40 in track, portion 46 along arrow 47 bonding agent is dispensed along surface 41. Subsequently slide binder element 40 is pushed on track portion 48 along arrow 49 and thereupon bonding agent is dispensed by the two dispensers 52 and 54 concurrently on the surface portions 42 and 44, respectively. A similar slide binder element is then placed on top of the one shown to form a slide binder as shown in every detail in my copending application referred to above.

The bonding agent referred to above has a viscosity of 0.63 centipoise at 77° F., and a surface tension between 4,000 and 4,500 p.s.i. In the following detailed data are given on a liquid-dispensing apparatus of the type described and used successfully to dispense a bonding agent of the type mentioned above on a polystyrene slide binder element at sufficient quantity and at a very regular rate. The liquid-dispensing apparatus included a regular glass bottle as container 10, having the height of a few inches. The distance between points 19 and 26, which is the average height of the liquid column effective at opening 25 is about 1¾ inch, and the tube end 22 was about two-thirds inch long. The inner diameter of the tube was one thirty-sixth of an inch, (or two-thirds of a millimeter) the slot 25 has a width thickness of 5 milli-inches or one-eighth of a millimeter and a length of about one-fourth inch or less. The tube was made of aluminum and the stopper 30 made of polyethlyene. The inclination of tube stem 24 relative to the vertical and, therefore, the inclination of tube portion 22 to the horizontal, is 15°. The diameter of opening 17 of the equipment was 128 milli-inches, the outer diameter of polyethylene stopper 30 was 130 milli-inches to provide a tight fit in opening 17. There are 12 ridges 31 for the star pattern of stopper 30 and the resulting channels 32 were about one-third of a millimeter.

The invention is not limited to the embodiments described above but all changes and modifications thereof not constituting departures from the spirit and scope of the invention are intended to be covered by the following claims.

I claim:

1. A liquid-dispensing apparatus comprising:
   a container serving as reservoir for liquid and having an opening which is not upwardly directed;
   a capillary tube positioned to traverse the opening so as to communicate with the liquid in the container and extending in down direction from the container, there being a narrow, longitudinal slot in the tube displaced from the end of the tube;
   means defining at least one capillary opening in the container, the capillary opening being open to the atmosphere outside of the container and communicating with the liquid in the container below the lowest operating liquid level therein, thereby defining a liquid column in the capillary tube as extending between a horizontal plane at the slot and a horizontal plane at the capillary opening; and
   the portion of the tube having the slot for selective positioning in liquid contact with an object upon which liquid is to be dispensed, the slot having dimension so that surface tension of the liquid and the meniscus plus the slot balance the liquid pressure of the liquid column in the absence of the object.

2. A liquid-dispensing apparatus as set forth in claim 1, the container being positioned so that the opening is downwardly directed; the means defining at least one capillary including the opening, further including a member inserted in the opening and having longitudinal slots to define a plurality of capillary openings, the member having a central opening in which said tube is inserted.

3. A liquid-dispensing apparatus as set forth in claim 2, said member being slidably positioned in the container opening for adjusting the rate of flow through the slot upon contact with an object upon which liquid is to be dispensed.

4. A liquid-dispensing apparatus as set forth in claim 3, the tube being L-shaped, the upper stem portion of the L being received by the member, container and tube being positioned so that the main stem of the L-shaped tube is inclined by a small angle relative to the vertical, the member being adjusted in the opening in that inclined direction.

5. A liquid-dispensing apparatus as set forth in claim 1, opening being downwardly directed, the tube being L-shaped, the stem of the L being positioned in the opening, the short end of the L being slightly bent upward, the tube being opened at that short end, the slot being positioned in the bent portion of the L.

6. A dispensing apparatus as set forth in claim 5, the slot extending within different horizontal planes so that a portion of the slot is above the lowest point of the tube portion of the slot as provided with the slot.

7. A liquid-dispensing device comprising:
   first means defining a reservoir having capillary relief channels in a region at least normally below the level of liquid therein, the space above the level being enclosed by the first means to inhibit communication with the exterior other than through the capillary relief channel;

second means defining an at least essentially vertically extending capillary duct communicating with the interior of the reservoir, and having at its lower end a horizontally extending portion; and third means defining a narrow longitudinal slot in the horizontally extending portion, having dimensions so that at least in a particular range of heights of the relief channels above the slot, a meniscus is formed in the slot but preventing discharge of liquid in the undisturbed state of the slot.

8. A dispensing device as set forth in claim 7, the slot as defined by the third means extending in the said horizontal portion as well as into adjacent more vertically extending portions of the second means so that a portion of the slot is above the lowest point with slot of the horizontal portion.

9. A liquid dispensing device comprising:

first means defining a capillary liquid column extending essentially vertically between a longitudinal slot and a particular plane thereabove, the slot extending transverse to the interior of the defining means;

second means defining a liquid reservoir with bottom capillary relief openings in the particular plane, the reservoir communicating with the first means from above the capillary interior of the first means; and third means for replacing objects having surface wettable by the liquid in the reservoir in close proximity to the slot, the slot having dimensions to inhibit outflow by surface tension pressure in the absence of a wettable surface in close proximity to the slot.

10. A device as set forth in claim 9, the first means having an extension, the slot being located between the extension and the region of communication of the first means with the reservoir.

11. A device as set forth in claim 10, the extension being in open communication with the atmosphere at a level above the slot, but below the particular plane.